United States Patent [19]
De Haan et al.

[11] Patent Number: 5,777,682
[45] Date of Patent: Jul. 7, 1998

[54] MOTION-COMPENSATED INTERPOLATION

[75] Inventors: Gerard De Haan; Paul W. A. C. Biezen, both of Eindhoven, Netherlands

[73] Assignee: U.S. Philips Corporation, New York, N.Y.

[21] Appl. No.: 606,133

[22] Filed: Feb. 23, 1996

[30] Foreign Application Priority Data

Mar. 14, 1995 [EP] European Pat. Off. ............ 95200604

[51] Int. Cl.$^6$ .................. H04N 5/14; H04N 9/64; H04N 7/01; H04N 11/20
[52] U.S. Cl. ............... 348/452; 348/452; 348/451; 348/699
[58] Field of Search ................ 348/699, 452, 348/451, 458; H04N 5/14, 9/64, 7/01, 11/20

[56] References Cited

U.S. PATENT DOCUMENTS

| | | | |
|---|---|---|---|
| 5,005,078 | 4/1991 | Gillard | 358/140 |
| 5,410,356 | 4/1995 | Kikuchi et al. | 348/699 |
| 5,467,136 | 11/1995 | Odaka et al. | 348/699 |
| 5,510,856 | 4/1996 | Jung | 348/699 |
| 5,534,946 | 7/1996 | De Haan et al. | 348/452 |
| 5,619,281 | 4/1997 | Jung | 348/699 |

FOREIGN PATENT DOCUMENTS

0475499A1  3/1992  European Pat. Off. ........ H04N 5/44

Primary Examiner—Mark R. Powell
Assistant Examiner—Virek Srivastava
Attorney, Agent, or Firm—Steven R. Biren

[57] ABSTRACT

A method of motion-compensated interpolation of a picture signal (Pi) having input fields, comprises the steps of providing (ME) motion vectors (D) between a first and a second input field of the picture signal (Pi), and providing (MC1, OC) an interpolated field (Po) on the basis of at least one input field in dependence upon the motion vectors (D). At least one further motion vector (Dmax) is furnished (C2) in addition to each provided motion vector (D), whereby the interpolated field (Po) is furnished (MC1, MC2, OC) in dependence upon both the first-mentioned motion vectors (D) and the further motion vectors (Dmax).

7 Claims, 1 Drawing Sheet

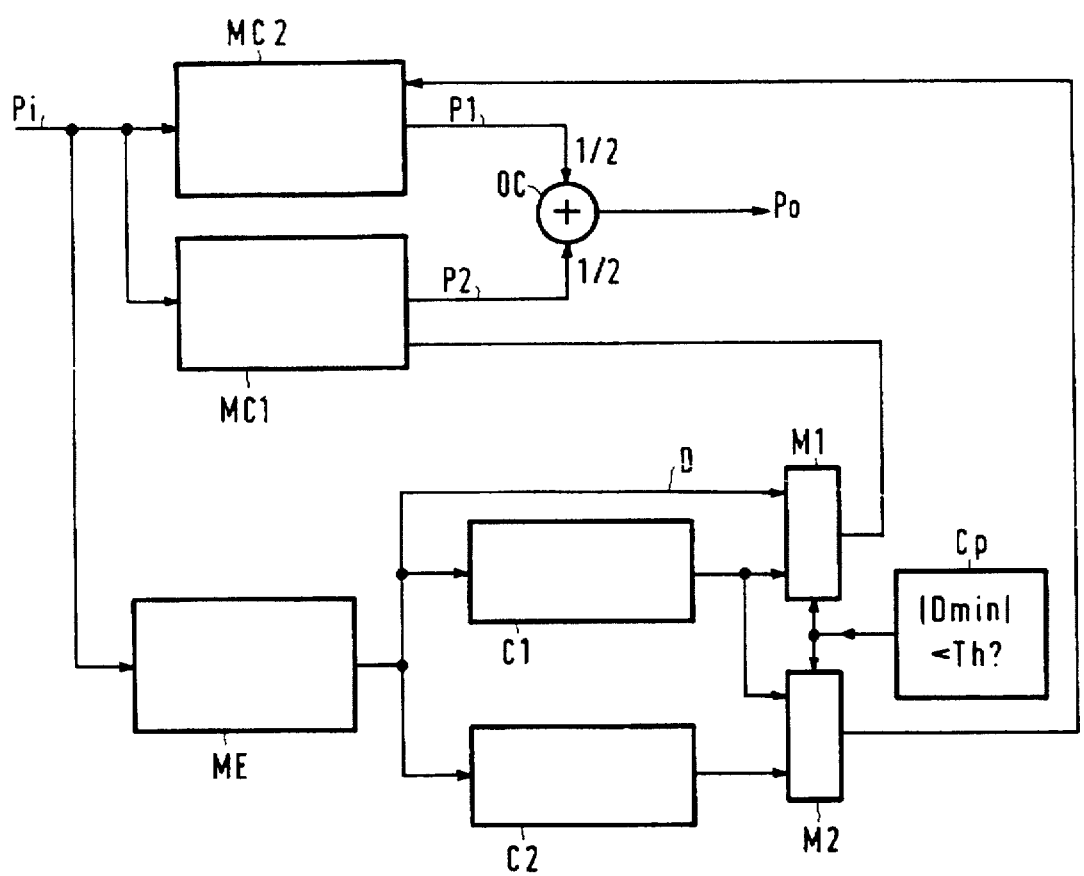

MOTION-COMPENSATED INTERPOLATION

BACKGROUND OF THE INVENTION

1. Field of the Invention

The invention relates to a motion compensated interpolation of picture signals.

2. Description of the Related Art

Many prior art documents show techniques for implementing such a motion-compensated interpolation of picture signals. In pictures resulting from motion-compensated field rate converters a halo-like artifact is usually visible at the boundary of moving objects. EP-A-0,475,499 discloses a system for field rate conversion in which the interpolated pictures result from just one neighboring field. The advantage of such an approach is the improved dynamic resolution of the resulting pictures.

SUMMARY OF THE INVENTION

It is, inter alia, an object of the invention to reduce this local artifact. To this end, a first aspect of the invention provides a method of motion-compensated interpolation of a picture signal having input fields, the method comprising the steps of providing motion vectors between a first and a second input field of said picture signal; and providing an interpolated field on the basis of at least one input field in dependence upon said motion vectors, characterized in that the method includes the steps of providing in addition to each motion vector, at least one further motion vector; wherein said interpolated field is provided in dependence upon both said first-mentioned motion vectors and said further motion vectors. A second aspect of the invention provides an interpolation device for motion-compensated interpolation of a picture signal having input fields, the device comprising means for providing motion vectors between a first and a second input field of said picture signal; and means for providing an interpolated field on the basis of at least one input field in dependence upon said motion vectors; characterized in that said device further comprises means for providing in addition to each motion vector, at least one further motion vector; wherein said interpolated field is provided in dependence upon both said first-mentioned motion vectors and said further motion vectors. A third aspect of the invention provides a picture signal display apparatus, comprising means for receiving a picture signal having input fields; a device for providing an interpolated field in response to said input fields; means for interleaving said input fields and said interpolated field to obtain an interleaved picture signal; and means for displaying said interleaved picture signal.

A method of motion-compensated interpolation of a picture signal having input fields, comprises the steps of providing motion vectors between a first and a second input field of the picture signal, and providing an interpolated field on the basis of at least one input field in dependence upon the motion vectors. In accordance with the invention, at least one further motion vector is furnished in addition to each provided motion vector, whereby the interpolated field is furnished in dependence upon both the first-mentioned motion vectors and the further motion vectors.

The invention is especially advantageous in motion vector compensated interpolation systems which obtain the interpolated field by a motion vector compensated shift of one field only, rather than by a kind of motion vector compensated average of two input fields. It is possible that a motion vector estimated between first and second fields is used to unilaterally shift a third field; such a method could appear to yield advantages with regard to the required amount of memory hardware.

These and other aspects of the invention will be apparent from and elucidated with reference to the embodiments described hereinafter.

BRIEF DESCRIPTION OF THE DRAWINGS

In the drawing:

FIG. 1 schematically illustrates an embodiment of a television display apparatus comprising a picture interpolation device in accordance with the present invention.

DESCRIPTION OF THE PREFERRED EMBODIMENT

In the embodiment of FIG. 1, an input picture signal Pi is applied to a motion vector estimator ME which calculates a motion vector D for each block of an array of blocks into which the pictures are divided. An output of the motion vector estimator ME is applied to a first calculation circuit C1 which determines the smallest motion vector Dmin of the set of motion vectors determined for a current block and its adjacent blocks. The output of the motion vector estimator ME is also applied to a second calculation circuit C2 which determines the motion vector Dmax which shows the largest difference to the current motion vector D, among the set of motion vectors determined for the current block and its adjacent blocks. A multiplexer M1 applies the motion vector D or the motion vector Dmin to a first motion-compensated interpolation circuit MC1 which determines a first picture signal P1 on the basis of the input picture signal Pi. A multiplexer M2 applies the motion vector Dmax or the motion vector Dmin to a second motion-compensated interpolation circuit MC2 which determines a second picture signal P2 on the basis of the input picture signal Pi. The multiplexers M1 and M2 are controlled by a comparator Cp which determines whether the motion vector Dmin falls below a threshold Th. An output circuit OC furnishes an output picture signal Po on the basis of the picture signals P1 and P2. The input picture signal Pi and the output picture signal Po are interleaved by an interleaving circuit IL and displayed on a monitor M.

The invention deals with the following problem. In pictures resulting from motion-compensated field rate converters a halo-like artifact is usually visible at the boundary of moving objects, i.e., near discontinuities in the velocity plane. It is an object of the present invention to reduce this local artifact, without introducing global disadvantages. To this end, in one embodiment of the invention, the picture is interpolated with two motion vectors for every location. The first vector D, is the one calculated for the current position, whereas the other is the most extremely differing one, Dmax, available in a predefined neighborhood of the current position. An example of a possible neighborhood is the area of 3 by 3 blocks as used for a block-matching motion estimation algorithm. The effect is that in case of a discontinuity in the velocity field, every position is at least compensated with the correct motion vector (and also with the wrong motion vector). Consequently, the artifact has been reduced with 3 dB. Disadvantage of the method is that the area of the halo is increased, but experiments indicate that the overall result is subjectively more attractive. Obviously, the method does not introduce any defects in areas with a homogeneous motion vector field.

An alternative for the present proposal would be to apply a larger number of motion vectors (taken from a neighborhood of the current position) instead of using the most extreme neighboring motion vector. This however would cost more access to the compensation device (memory).

In a sophistication of the method, it is checked whether one of the motion vectors (the current one or any of the neighboring motion vectors) is close to the zero vector 0, i.e., |Din|<threshold (vector length or absolute sum of vector components). If this is the case, only one motion vector is used in the motion-compensated interpolation, preferably the smallest, i.e., Din, which is closest to the zero vector 0. The background of this sophistication is, that stationary parts of the picture (particularly critical stationary parts such as subtitles) are not degraded by the use of more than one mot ion vector. FIG. 1 illustrates the present invention including this sophistication.

It will be clear that although the FIGURE shows two separate motion compensators MC and MC, it will generally be possible to share the memory devices required for the shifting operation . Also, the memory devices used for the motion-compensated shift or interpolation may be shared with the motion vector estimator ME.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The invention can be implemented by means of hardware comprising several distinct elements, and by means of a suitably programmed computer. The output circuit could be a median filter based circuit which determines the median of the pixel from the input picture Pi and the pictures P and P. Instead of taking the vector Max showing the largest difference with regard to the current motion vector D, it is possible to take some other suitably chosen motion vector, for example, the vector which was optimal for the block located at the left upper corner point of the current block. A block does not necessarily need to have a square shape; any other form is possible.

We claim:

1. A method of motion-compensated interpolation of a picture signal having input fields, the method comprising the steps of:

generating motion vectors between a first and a second input field of said picture signal; and generating an interpolated field as a function of at least one input field and said motion vectors;

characterized in that said method further comprises the steps of:

generating, in addition to each motion vector, at least one further motion vector; wherein said interpolated field is generated as a function of both said first-mentioned motion vectors and said further motion vectors.

2. A method as claimed in claim 1, wherein said further motion vector is taken to be different from the corresponding first-mentioned motion vector.

3. A method as claimed in claim 2, wherein said further motion vector is selected from among a set of motion vectors determined for a current block of pixel elements for which the first-mentioned motion vector has been provided, and its adjacent blocks of pixel elements, wherein the further motion vector shows the largest difference to the current motion vector.

4. A method as claimed in claim 1, characterized in that said method further comprises the steps:

providing, in addition to each motion vector corresponding to a given part of a picture, a smallest motion vector taken from the group of said first-mentioned motion vectors and at least one motion vector corresponding to at least one neighboring part of said picture; wherein said interpolated field is provided in dependence upon said first-mentioned motion vectors, said further motion vectors, and said smallest motion vectors.

5. A method as claimed in claim 4, wherein if the magnitude of said smallest motion vector falls below a given threshold, said given part of the picture is interpolated in dependence upon said smallest motion vector only.

6. A device for motion-compensated interpolation of a picture signal having input fields, the device comprising:

means for generating motion vectors between a first and a second input field of said picture signal; and means for generating an interpolated field as a function of at least one input field and said motion vectors;

characterized in that said device further comprises:

means for generating, in addition to each motion vector, at least one further motion vector; wherein said interpolated field is generated as a function of upon both said first-mentioned motion vectors and said further motion vectors.

7. A picture signal display apparatus, comprising:

means for receiving a picture signal having input fields;

a device for motion-compensated interpolation of a picture signal having input fields, the device comprising:

means for generating motion vectors between a first and a second input field of said picture signal; and means for generating an interpolated field as a function of at least one input field and said motion vectors;

characterized in that said device further comprises:

means for generating, in addition to each motion vector, at least one further motion vector; wherein said interpolated field generated as a function of both said first-mentioned motion vectors and said further motion vectors;

means for interleaving said input fields and said interpolated field, to obtain an interleaved picture signal; and means for displaying said interleaved picture signal.

* * * * *